US010225081B2

(12) United States Patent
Wabnig et al.

(10) Patent No.: US 10,225,081 B2
(45) Date of Patent: Mar. 5, 2019

(54) SECURED WIRELESS COMMUNICATIONS

(71) Applicant: Nokia Corporation, Espoo (FI)

(72) Inventors: Joachim Wabnig, Cambridgeshire (GB); Antti Niskanen, Cambridgeshire (GB); Hongwei Li, Cambridgeshire (GB); David Bitauld, Cambridgeshire (GB)

(73) Assignee: Nokia Technologies Oy, Espoo (FI)

( * ) Notice: Subject to any disclaimer, the term of this patent is extended or adjusted under 35 U.S.C. 154(b) by 155 days.

(21) Appl. No.: 15/090,851

(22) Filed: Apr. 5, 2016

(65) Prior Publication Data

US 2016/0218869 A1   Jul. 28, 2016

Related U.S. Application Data

(63) Continuation of application No. 14/402,677, filed as application No. PCT/IB2012/052745 on May 31, 2012, now Pat. No. 9,641,326.

(51) Int. Cl.
*H04L 9/14* (2006.01)
*H04L 9/08* (2006.01)
*H04B 10/70* (2013.01)

(52) U.S. Cl.
CPC .......... *H04L 9/0858* (2013.01); *H04B 10/70* (2013.01); *H04L 9/14* (2013.01); *H04L 2209/24* (2013.01); *H04L 2209/80* (2013.01)

(58) Field of Classification Search
None
See application file for complete search history.

(56) References Cited

U.S. PATENT DOCUMENTS 4,445,780 A * 5/1984 Burns ................... G02B 6/125
356/466
6,188,768 B1 * 2/2001 Bethune ................ H04L 9/0858
380/278

(Continued)

FOREIGN PATENT DOCUMENTS

GB          2441364 A     3/2008
WO      2012018246        2/2012

OTHER PUBLICATIONS

Lang et al., "Reference Frame Independent Quantum Key Distribution", Phys. Review, vol. 82, Mar. 4, 2010, pp. 1-5.

(Continued)

*Primary Examiner* — Farid Homayounmehr
*Assistant Examiner* — Olanrewaju J. Bucknor
(74) *Attorney, Agent, or Firm* — Harrington & Smith

(57) ABSTRACT

For secure wireless communications the sender device uses a rail encoder that outputs dual rail-encoded states of light in a time slot. The states of light dual rail-encode information according to a phase and/or intensity difference between the dual rails, and the rail-encoded states of light may further be converted to a polarization-encoded state. This may be implemented using at least two polarizing beam-splitters with at least one quarter-wave plate disposed therebetween; and/or with integrated waveguides that convert three optical inputs to two optical outputs that are input to a polarization rotator-combiner. The encoder may randomly define the polarization-encoded state such as by randomly selecting from a finite number of at least N=3 possible polarization rotations. The recipient device may use 2N parallel channels to decode the dual rail-encoded states of light, each channel comprising a detector configured to detect one of N possible polarization states.

18 Claims, 8 Drawing Sheets

(56) References Cited

U.S. PATENT DOCUMENTS

| | | | |
|---|---|---|---|
| 6,289,104 B1* | 9/2001 | Patterson | H04L 9/0858 380/256 |
| 7,805,079 B1* | 9/2010 | Meyers | H04B 10/11 398/118 |
| 8,054,976 B2* | 11/2011 | Harrison | G06Q 20/367 380/278 |
| 8,311,224 B2* | 11/2012 | Chen | A63B 7/00 380/256 |
| 2003/0169880 A1* | 9/2003 | Nambu | H04L 9/0852 380/256 |
| 2004/0151321 A1* | 8/2004 | Lutkenhaus | H04L 9/0858 380/278 |
| 2005/0135620 A1* | 6/2005 | Kastella | H04L 9/0858 380/256 |
| 2006/0083379 A1* | 4/2006 | Brookner | H04L 9/0852 380/286 |
| 2008/0031637 A1* | 2/2008 | Tomaru | H04B 10/548 398/188 |
| 2008/0310856 A1 | 12/2008 | Poppe | |
| 2009/0034737 A1* | 2/2009 | Trifonov | H04B 10/85 380/278 |
| 2009/0041243 A1* | 2/2009 | Nambu | H04L 9/0858 380/256 |
| 2009/0106553 A1* | 4/2009 | Wang | A63B 7/00 713/168 |
| 2010/0080394 A1 | 4/2010 | Harrison et al. | |
| 2010/0157310 A1* | 6/2010 | Bennett | G01C 19/72 356/491 |
| 2010/0208893 A1 | 8/2010 | Toyoshima et al. | |
| 2011/0019823 A1* | 1/2011 | Townsend | H04L 9/0852 380/256 |
| 2011/0206204 A1* | 8/2011 | Sychev | H04J 14/02 380/256 |
| 2012/0039617 A1 | 2/2012 | Duligall et al. | |
| 2012/0087500 A1 | 4/2012 | Ukita et al. | |
| 2012/0195430 A1 | 8/2012 | Niskanen et al. | |

OTHER PUBLICATIONS

Mackay, "information Theory, Inference and Learning Algorithms", Cambridge University Press, Version 6.0, Jun. 26, 2003, 640 pgs.

Scarani et al., "The security of practical quantum key distribution", Reviews of Modern Physics, vol. 81, No. 3, Jul.-Sep. 2009, pp. 1301-1350.

"Quantum Cryptography: Privacy Through Uncertainty", ProQuest, Retrieved on Jan. 20, 2015, Webpage available at: http://www.csa.com/discoveryguides/crypt/overview.php.

Sharma, "Quantum Cryptography: A New Approach to Information Security", International Journal of Power System Operation and Energy Management (IJPSOEM), vol. 1., Issue 1, 2011, pp. 11-13.

Lana S. et al., "Finite-key security against coherent attacks in quantum key distribution", Pub.Dec. 1, 2010, vol. 12, No. 12, p. 123019.

Liu X B. et al., "Quantum key distribution system with six polarization slates encoded by phase modulation", Pub. Nov. 2008, vol. 25, No. 11, pp. 3856-3859.

Li J-L. et al., "Six-State Quantum Key Distribution Using Photons with Orbital Angular Key Distribution Using Photons with Orbital Angular Momentum,'" Pub. Nov. 1, 2010, vol. 27, No. 11 p. 110303.

Brierley, Stephen, "Quantum Key Distribution Highly Sensitive to Eavesdropping", arxiv.org, Cornell University Library, 201 Olin Library Cornell University, Ithaca, NY 14853, Oct. 14, 2009, 19 pgs.

* cited by examiner

SECURED WIRELESS COMMUNICATIONS

CROSS-REFERENCE TO RELATED APPLICATIONS

This application is a continuation of U.S. patent application Ser. No. 14/402,677, filed on Nov. 20, 2014 as a US national stage entry from PCT/IB2012/052745 which was filed on May 31, 2012.

TECHNOLOGICAL FIELD

This disclosure relates to wireless communications and more particularly to secured wireless communications.

BACKGROUND

In wireless communications wireless channels are provided between two or more nodes such as fixed and/or mobile communication devices, access points such as base stations, servers, machine type devices, and so on. Examples of wireless systems include public land mobile networks (PLMN) such as cellular networks, satellite based communication systems and different wireless local networks, for example wireless local area networks (WLAN) and/or Worldwide Interoperability for Microwave Access (WiMax). A device for such systems is provided with appropriate signal receiving and transmitting apparatus for enabling communications with other parties. Wireless systems enable mobility for users where a mobile device can communicate over an air interface with another communication device such as e.g. a base station and/or other user equipment.

Data transmissions between parties may need to be secured. Applications, for example banking, shopping, email and so on, may rely on secure transactions over the Internet or other networks open to attacks. Increase in Internet commerce and transfer of computing tasks to remote servers (e.g. "cloud computing") has emphasized the need to maintain appropriate security of communications. Security can be provided based on a cryptographic protocol. Current cryptographic schemes (e.g. public key encryption) rely on the hardness of solving certain mathematical problems. For example, the commonly used RSA encryption algorithm is based on the hardness of factoring a large number into its prime factors. This is a hard problem using standard computer technology but can become solvable with development of more powerful computing technologies, for example by a future quantum computer. In the context of mobile communications an issue may arise in that the mobile devices are often handheld or otherwise portable and thus should be as lightweight and simple as possible. Because of the mobility of the devices their location relative to the other party might not be known. It is noted that the above discussed issues are not limited to any particular communication environments and apparatus but may occur in any context where security is needed for wireless communications.

Embodiments of the invention aim to address one or several of the above issues.

SUMMARY

In accordance with an embodiment there is provided a method comprising emitting from a sender device randomly photons in a first polarization, a second polarization and a third polarization without aligning a polarization system in a plane perpendicular to the first and second polarizations with a recipient device, the recipient device being adapted for detection of events in association with six polarizations, receiving information of detected events from the recipient device, and processing the received information and stored information to determine events where same polarization basis was used by the sender device and the recipient device.

In accordance with an embodiment there is provided a method comprising receiving at a recipient device photons from a sender device via an optical channel emitted on a first polarization, a second polarization and a third polarization without aligning a polarization system in a plane perpendicular to the first and second polarizations with the sender device, selecting randomly polarization basis for measurement of received photons for detection of events on six polarizations, sending information of detected events in association with three basis to the sender device, and receiving information from the sender device of events where same polarization basis was used by the sender device and the recipient device.

In accordance with an embodiment there is provided an apparatus configured to cause emission of photons using randomly a first polarization, a second polarization and a third polarization for sending the photons without aligning a polarization system in a plane perpendicular to the first and second polarizations with a recipient device, the recipient device being adapted for detection of events in association six polarizations, and process information of detected events received from the recipient device and information stored in the sender device to determine events where same polarization basis was used by the sender device and the recipient device. In accordance with an embodiment there is provided an apparatus configured to randomly select basis for measurement of photons received from a sender device emitted on a first polarization, a second polarization and a third polarization without aligning a polarization system in a plane perpendicular to the first and second polarizations, and detect events in association with said six polarizations, cause sending of information of detected events, and receive information of events where the same polarization basis was used by the sender device and the recipient device.

In accordance with a more detailed embodiment a raw key is determined based on events where the first polarization and/or second polarization basis was used by the sender device and the recipient device.

Certain predefined events dependent of the use of bases can be used for parameter estimation.

The received information and stored information may be compared to determine bits for a raw key and bits for error correction.

Bit values for use in error correction may be communicated when use of the same basis for at least one event is determined.

The polarizations may be provided on the Poincare sphere. The polarizations by a sender device may comprise a main polarization, an opposite to the main polarization and a polarization perpendicular to the main polarization.

Key distribution rate may be controlled based on distribution between polarizations.

Synchronized timing may be used in association with the events. A time synchronized record of events detected by the recipient device may be correlated with a record of events maintained by the sender device, and the information obtained may be sifted to obtain raw keys based on bits in times when the same basis was used by the sender and recipient devices.

A mobile device and/or a base station arranged to implement the embodiments may also be provided.

In another aspect of the invention there is apparatus comprising a rail encoder configured to output dual rail-encoded states of light in a time slot. In this aspect the states of light dual rail-encode information according to a phase and/or intensity difference between the dual rails. The rail encoder may be further configured to convert the rail-encoded states of light to a polarization-encoded state. In various examples below the rail encoder dual rail-encodes and polarization-encodes the states of light using at least two polarizing beam splitters with at least one quarter wave plate disposed therebetween, or the rail encoder dual rail-encodes the states of light using integrated waveguides that convert three optical inputs to two optical outputs and polarization-encodes outputs of the integrated waveguide using a polarization rotator-combiner. The rail encoder may randomly define the polarization-encoded state, such as by randomly selecting from a finite integer number N of at least three possible polarization rotations.

The above described rail encoder may also be configured to optically filter the polarization-encoded state of light to match at least one of spatial and frequency characteristics across all of the polarization-encoded states of light that are optically transmitted from the apparatus hosting the rail encoder; and it may be further configured to attenuate each of the optically filtered polarization-encoded states of light to a same number of photons for transmission. In the described examples such an optical encoder is disposed within a host sender device, and the attenuated states of light form a quantum cryptographic key that is transmitted by the host sender device to a recipient device over an optical link. It may also be configured to detect photon splitting attacks and/or to implement decoy states by varying a value of the same number of photons when distributing different quantum cryptographic keys.

In a corresponding aspect of the invention on the decoding side a rail decoder is configured to decode dual rail-encoded states of light in a time slot. The states of light may dual rail-encode information according to a phase and/or intensity difference between the dual rails. In one embodiment the rail decoder is configured to decode dual rail-encoded states of light after first decoding polarization-encoded states of light. In the described example the rail decoder decodes the dual rail-encoded states of light on 2N parallel channels, each channel comprising a detector configured to detect one of N possible polarization states. The polarization-encoded states of light may be decoded from a polarization rotation that is randomly selected from among three possible polarization rotations. The rail decoder apparatus may comprises an optical decoder disposed within a recipient device, where inputs to the optical decoder comprise a quantum cryptographic key received at the recipient device from a sender device over an optical link.

A computer program comprising program code means adapted to perform the herein described methods and techniques may also be provided. In accordance with further embodiments apparatus and/or computer program product that can be tangibly embodied on a computer readable memory for providing at least one of the above methods or techniques is provided.

It should be appreciated that any feature of any aspect may be combined with any other feature of any other aspect.

BRIEF DESCRIPTION OF THE DRAWINGS

Embodiments will now be described in further detail, by way of example only, with reference to the following examples and accompanying drawings.

DETAILED DESCRIPTION

In the following certain exemplifying embodiments are explained in the context of wireless or mobile communications where secure communications are provided for a mobile communication device. A mobile device for communications with e.g. a base station is often referred to as user equipment (UE) or terminal. A mobile device for implementing the embodiments may be provided by any device capable of sending wireless signals to and/or receiving wireless signals on a wireless channel. The mobile device is also provided with apparatus for communication on an optical channel. Non-limiting examples of mobile devices include a mobile station (MS) such as a mobile phone or what is known as a 'smart phone', a portable computer such as a laptop, tablet or a personal data assistant (PDA) provided with wireless communication capabilities, or any combinations of these or the like. An appropriate mobile device is provided with at least one data processing entity, at least one memory, and other possible components for use in software and hardware aided execution of tasks it is designed to perform, including control of communications with other parties and features relating to secure communications. The data processing, storage and other relevant control apparatus can be provided on an appropriate circuit board and/or in chipsets.

A quantum key distribution system is used in the below described embodiments for securing mobile communications. A possible use case can be a mobile device establishing a shared key with a stationary terminal. Cryptographic schemes that use properties of quantum mechanical systems to distribute a secure key are considered as providing high levels of security. For example, the current belief is that even a powerful eavesdropper who would only be limited by the laws of physics should not be able to compromise the security of the scheme. Implementations of quantum key distribution schemes rely on sending single photons between two terminals. In accordance with an embodiment a lightweight quantum key distribution arrangement suitable for mobile use is provided where the need for precise alignment of polarization can be avoided.

Figure 1:
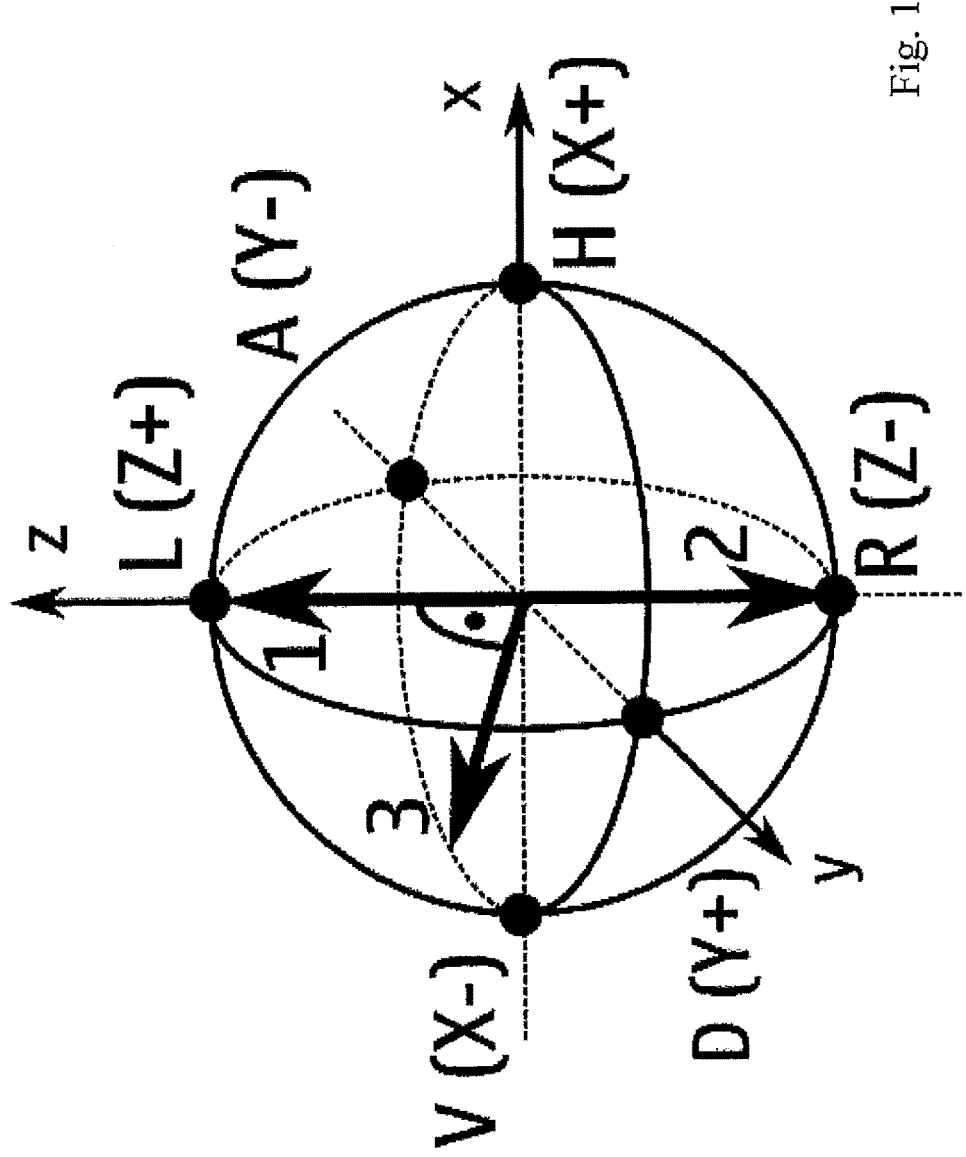
FIG. 1 shows polarizations on a Poincare sphere.

Before explaining possible terminal devices in more detail, a reference is made to a possible polarization system is represented on a Poincare sphere in FIG. 1. Perpendicularity of different polarizations can be defined on the Poincare sphere which is different from perpendicularity of polarization directions in a real space. The term perpendicular is used herein in this manner throughout this document. It is noted that terms polarization basis and polarization (direction) refer to different features. The polarization can be denoted for example as H, V, A, D, L, R. Polarization pairs form each a basis (H, V), (A, D), and (L, R).

Figure 2:
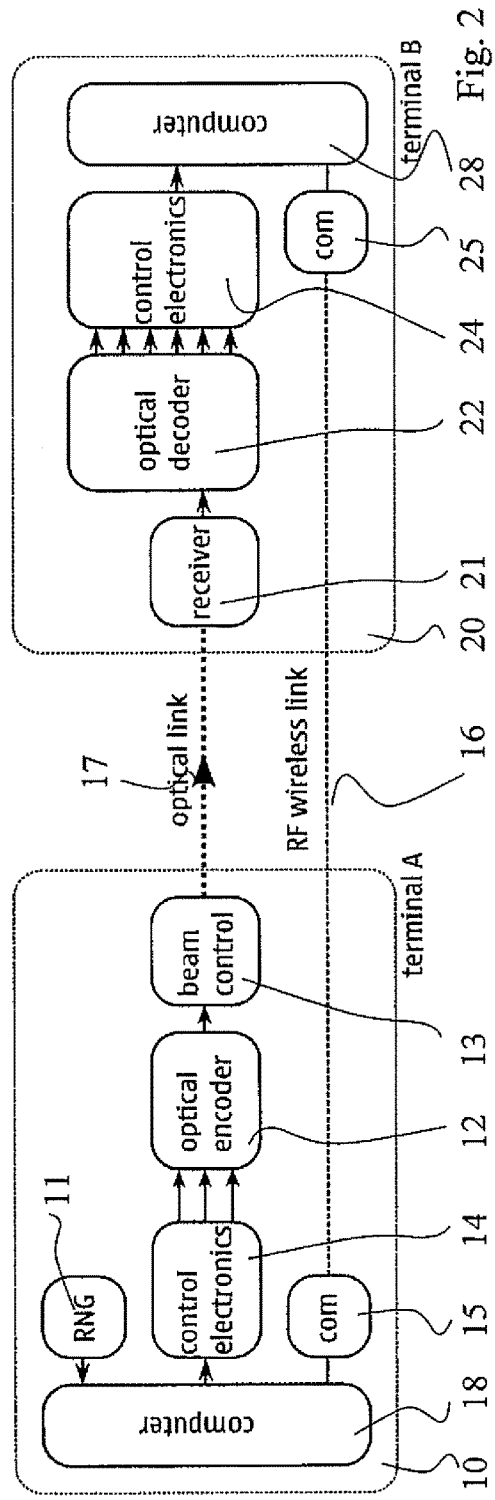
FIG. 2 shows a schematic diagram of two devices in accordance with an embodiment.

A sender device can emit single photons of three possible polarizations on what is known as the Poincare sphere shown schematically in FIG. 1. The possible polarizations, or states, can be a main polarization (1), its exact opposite (2) and a polarization perpendicular to the main polarization (3). A second or recipient devise can be adapted to measure the polarization in six directions. These polarizations can be the main direction and its opposite, two mutually perpendicular polarizations which are also perpendicular to the main polarization, and their two opposites. A quantum key distribution scheme can be provided between two devices. FIG. 2 shows a sender device 10, labelled terminal A, and a recipient device 10, labelled terminal B. In accordance with an embodiment terminal A comprises a mobile device, for example a mobile phone or a smartphone, a laptop, a notebook, a tablet computer and so forth and terminal B comprises a fixed node, for example a base station of a cellular system or a local network system.

In FIG. 2 a radio frequency (RF) wireless link 19 is provided between devices 10 and 20. Both devices are provided with a communications subsystem for the wireless communications, for example appropriate radio apparatus 15 and 25, respectively, to facilitate wireless communications on link 16. It is noted that a wireless channel between the devices can also be provided based on other technologies, such as via an optical link.

Distribution of keys between devices 10 and 20 is based on sending of photons from device 10 to device 20 over optical link 17. In accordance with an embodiment single photons are sent in each polarization. Apparatus for generating and emitting the photons can comprise an optical encoder 12 emitting single photons, a beam controller 13 which allows directing the photons towards the recipient device, control electronics 14 for creating the electrical pulses needed to emit single photons, a (quantum) random number generator 11, and a processor apparatus 18 for controlling these components. The apparatus 12 for optical encoding can be adapted to probabilistically convert light pulses emitted by the three light sources into a single photons polarized in three possible polarizations. Each light source can correspond to one polarization.

Two examples of the optical encoder are discussed below with reference to FIGS. 3 and 4.

Figure 3:
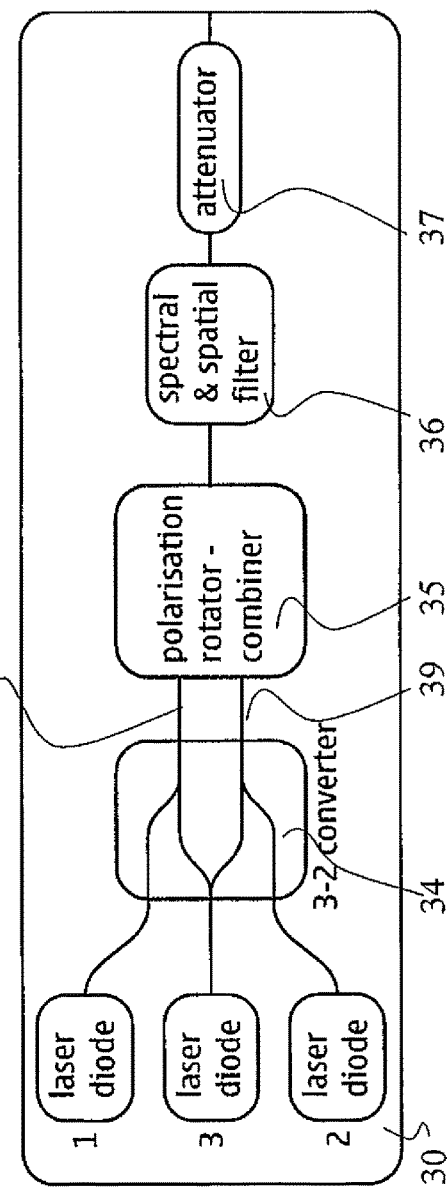
FIGS. 3 and 4 show block diagrams of exemplifying optical encoders.

In accordance with the example shown in FIG. 3 an optical encoder 30 comprises three light sources 1, 2, 3. The light sources can be provided by any appropriate source, for example by laser diodes or light emitting diodes (LEDs). A 3-2 converter 34, a polarization rotator-combiner 35, a spectral and spatial filter 36 and an attenuator 37 are also provided. Light generated by the light sources 1-3 can be converted to dual-rail encoding by the 3-2 converter such that light source 1 creates a pulse on a first rail 38 and light source 2 creates a pulse on a second rail 39 whilst light source 3 creates a pulse on both rails. The intensity of the pulse generated by light source 3 can be equal on both rails.

Figure 4:
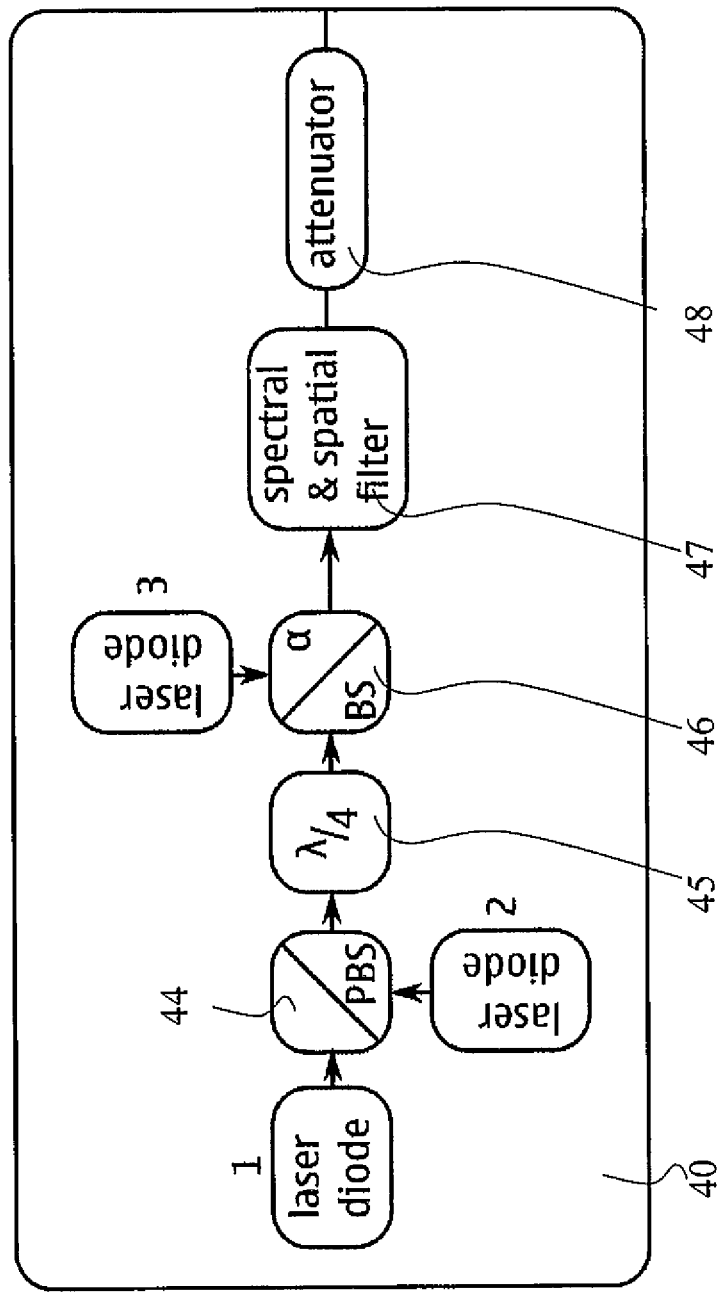

In the encoders of FIGS. 3 and 4 three polarizations can be used. The decoders of FIGS. 5 and 6 can measure six polarizations (two in each basis).

In accordance with a possibility the 3-2 converter apparatus can be implemented as integrated waveguides on a chip. The 3-2 converter can comprise a 50-50 beam splitter and two y-junctions connected as depicted in FIG. 3. The polarization rotator-combiner 35 converts the dual rail encoding into the polarization encoding (1, 2, 3). After that a spectral and spatial filter is applied to ensure that the three pulses are indistinguishable due to their spatial and frequency characteristics. Attenuation is applied before the photons exit the apparatus to bring the light pulses down to single photon level. Thus the attenuator 37 is provided as the last element of the optical encoder. The attenuation can be used to introduce a probabilistic element as the attenuation can be chosen in such a way that the average photon number per pulse is much smaller than one.

In probabilistic sources a strong light pulse is attenuated in such a way that it contains on average a photon number much smaller than one. As a result of the attenuation most of the pulses contains no photons, a small number contains one photon and an even smaller number contains multiple photons.

A problem that can arise when using attenuated light is that a small fraction of pulses can contain more than one photon. This may in certain occasions make the key distribution open to a photon number splitting attack where an eavesdropper intercepts one photon while letting the second one pass to terminal B. A technique that can be used to detect photon number splitting attacks is to use pulses with a variable number of photons. A variant of the scheme implementing decoy states can be provided by means of a tunable attenuator. A second embodiment of the optical encoder addressing these is shown in FIG. 4. An apparatus 40 according to this embodiment can comprise three light sources 1 to 3, a polarizing beam splitter (PBS) 44, a quarter wave plate ($\lambda/4$) 45, a beam splitter 46, a spectral and spatial filter 47, and an attenuator 48.

A single photon based scheme can be provided also in various other ways. According to a possibility true single photon emitters are used. In these each input pulse is converted to a single photon. No further attenuation at the end of a circuit is need. Another example is heralded single photon sources. In these, whenever a single photon is produced a second signal announces the presence of a single photon. Other events can be rejected.

Light sources 1 and 2 emit into the two arms of the polarizing beam splitter (PBS) 44. After the PBS the originally linear polarization (H, V) is converted to circular (L, R) by the quarter wave plate 45. The pulses then pass a beam splitter (BS) 46 with reflectivity a. The third light source 3 emits into the other arm of the beam splitter. A pulse in light source 1 creates a pulse of a first polarization after the BS, similarly for diodes 2 and 3. Spectral and spatial filtering is the same as in the example of FIG. 3.

Terminal B (see FIG. 2) can comprise a receiver that is able to receive a beam from terminal A. An optical decoder 22 capable of detecting single photons and their polarization along three axes i.e. capable of providing six possible outputs is also provided. Control electronics 24 adapted for processing detector outputs and record their time trace, a communications subsystem 25 for the wireless communication, and a computer or processor 26 for controlling the above components are also shown.

Figure 5:
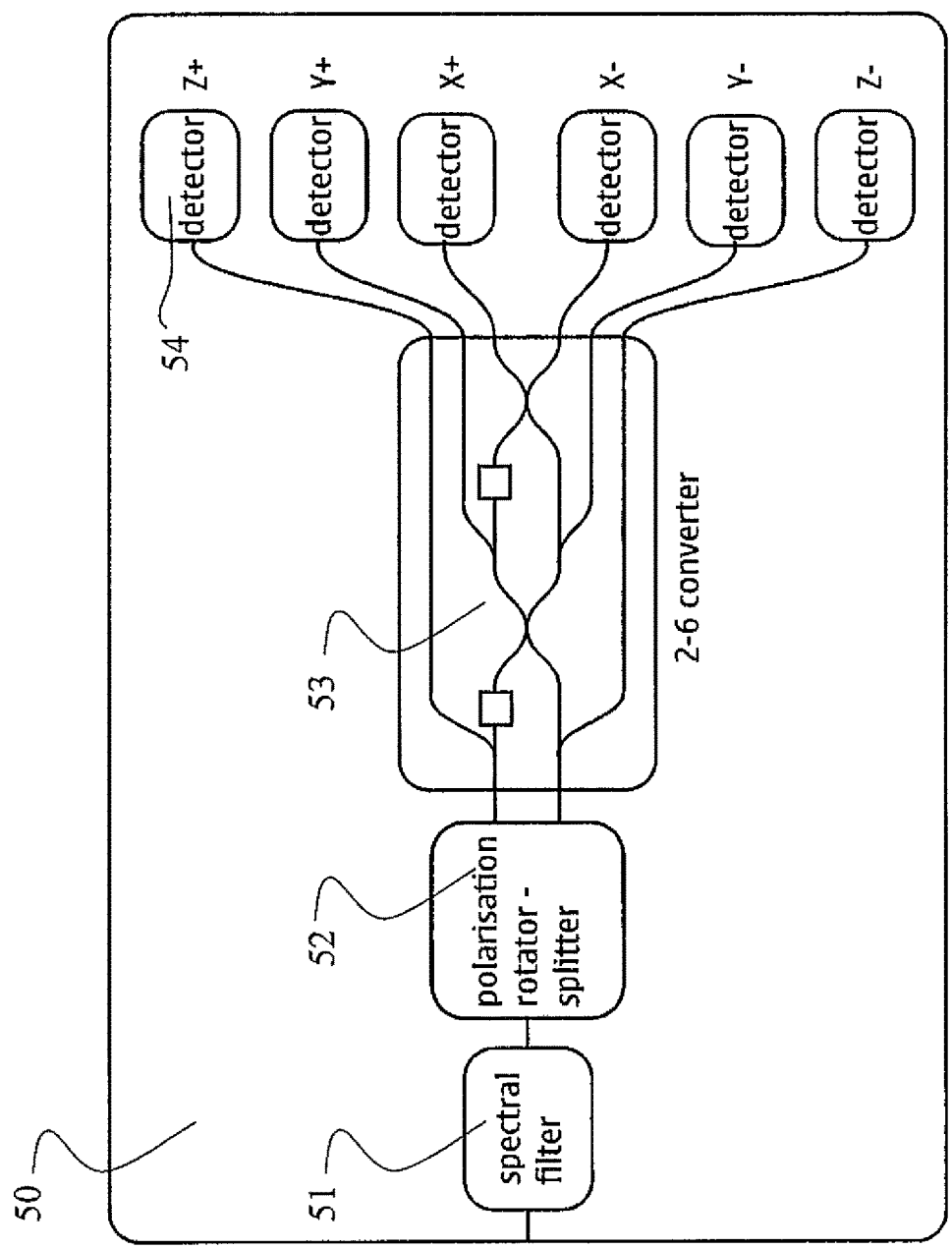
FIGS. 5 and 6 show block diagrams of exemplifying optical decoders.

Two different exemplifying implementations of the optical decoder for the recipient device 20, or terminal B of FIG. 2, are now discussed with reference to FIGS. 5 and 6. In FIG. 5 example a decoder 50 is provided that comprises a spectral filter 51 to filter out ambient light and allow only light sent from terminal A. A polarization rotator-splitter 52 is provided to convert the photon polarization to dual rail encoding, a 2-6 converter 53 is used to convert dual rail encoding to six separate channels. Six single photon detectors 54 (e.g. avalanche photodiodes) are also shown.

The 2-6 converter 53 can be implemented as integrated waveguides on a chip. A possible layout of the chip is shown in FIG. 5. The 2-6 converter can consist of 2 beam-splitters, two phase-shifters and four y-junctions. The transmission of the y-junctions can be adjusted to influence the relative frequency of detection events.

Figure 6:
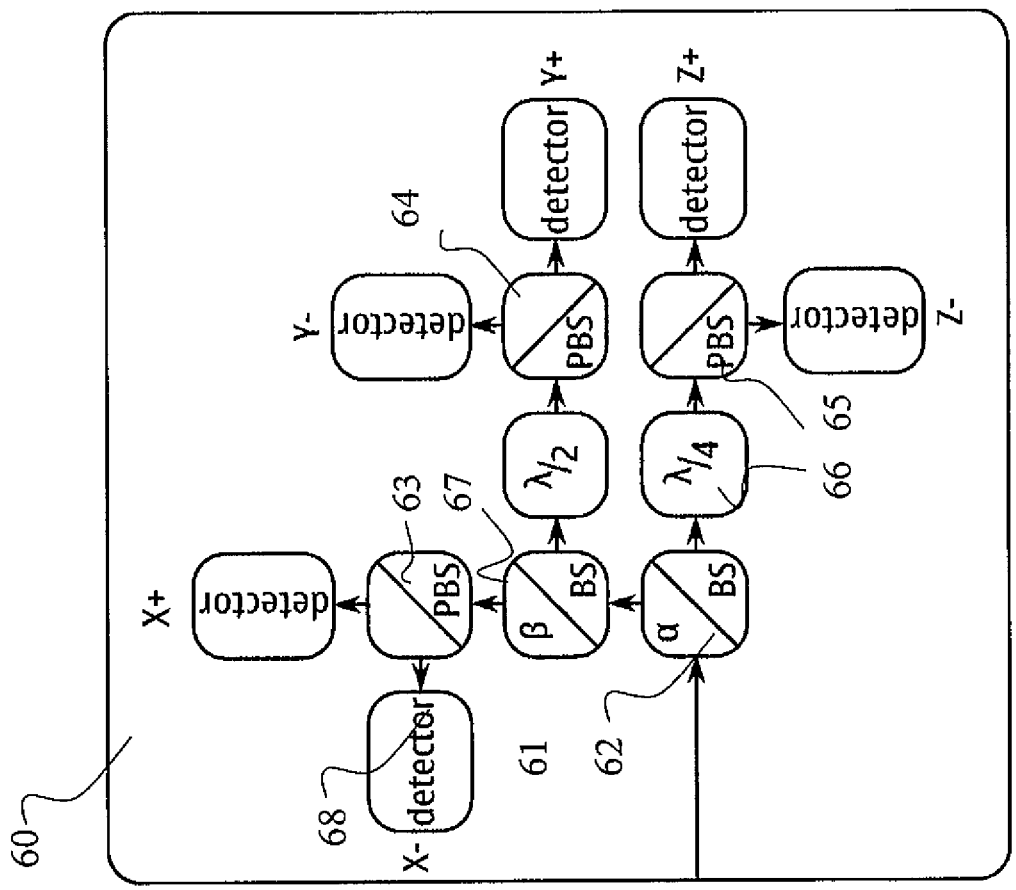

Another example for a decoder 60 is shown in FIG. 6. Two beam-splitters (BS) 61, 62 with reflectivities α and β, respectively, three polarizing beam-splitters (PBS) 63-65, a quarter wave plate 66, a half wave plate 67, and six single photon detectors 68 (e.g. avalanche photo diodes) are shown. Each block of two detectors 68 with their adjoining polarizing beam splitter can detect if a photon is horizontally or vertically polarized. Thus, to detect in the x-direction (see FIG. 1) no additional polarization rotation is necessary. The half wave plate rotates the z-direction (L,R) to the x-direction (H,V), while the quarter wave plate rotates y-direction (A,D) to the x-direction (H,V), so that they can be detected by the polarizing beam-splitter-detector assembly. The two beam splitters with reflectivity α and β, respectively, determine the relative frequency of detection in three bases.

The local polarization coordinate systems for terminal A and terminal B are not aligned in the xy-plane. Choice of (L, R) coordinates for the z-direction can be used to stabilize the system against perturbations.

A secure shared key can be obtained by means of this hardware. In the embodiment a unique combination of reference frame independence with a three state protocol is provided. In accordance with a possibility an explicit implementation of the protocol using integrated or bulk optics can be provided. This can be combined with a lightweight design tailored for handheld short-range line-of-sight use.

Figure 7:
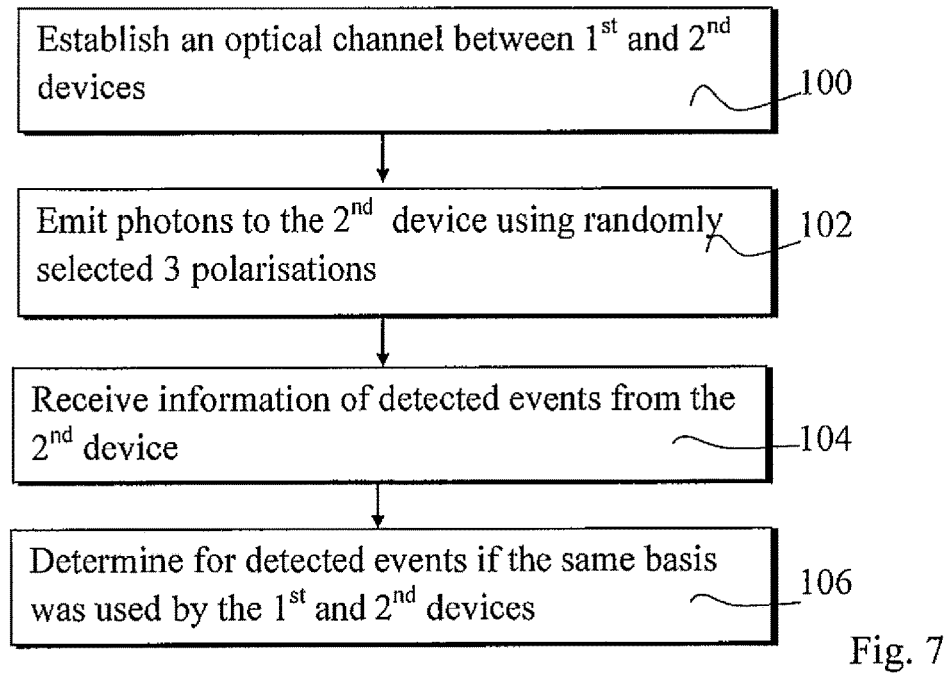
FIGS. 7 to 9 show flowcharts according certain embodiments.

In accordance with an embodiment an operation according to the flowchart of FIG. 7 is provided at a sender device. An optical channel is established at with a recipient device at 100 for emission of photons in a first polarization, a second polarization and a third polarization without aligning a polarization system in a plane defined based on the first and second polarizations with the recipient device. The plane can be defined as being perpendicular to the first and second polarizations. It is noted that perpendicular in here refers to polarization directions on the Poincare sphere, and not directions in real space. Photons are emitted at 102 in the direction of the recipient device using randomly the first, second and third polarizations as the basis for sending the photons. The sending takes place in arrangement where the recipient device is capable of detecting events in association with six polarizations. Information of detected events is then received at 104 from the recipient device. The sender device processes at 106 the received information and information stored in the sender device to determine events where the same basis was used by the sender device and the recipient device.

This information can be used in generation of raw keys and/or detection of eavesdropping. For example, it can be determined based on comparison of the received and stored information which bits are to be used for the raw key and which bits are to be used for error correction. For example, when a bit in a first or a second polarization was sent and the measurement basis was along one/two the bits are used for the raw key. Thus only events where polarization one or two was sent and measured contribute to a raw key. All other combinations containing the third direction enter to other procedures to determine secure key rate and/or corresponding shortening of the raw key using hash functions. Events where the third polarization is sent and measured may not contribute to the raw key. More detailed examples of these operations will be explained with reference to FIG. 9.

The number of polarizations of the sender device can be more than three. The three polarizations comprise two opposite polarizations, the third being in a plane perpendicular to the two opposite polarizations. Additional polarizations can be added so that the added polarization is perpendicular or opposite the other polarizations. In accordance with an embodiment the sender device is configured to send four or five polarizations.

Figure 8:
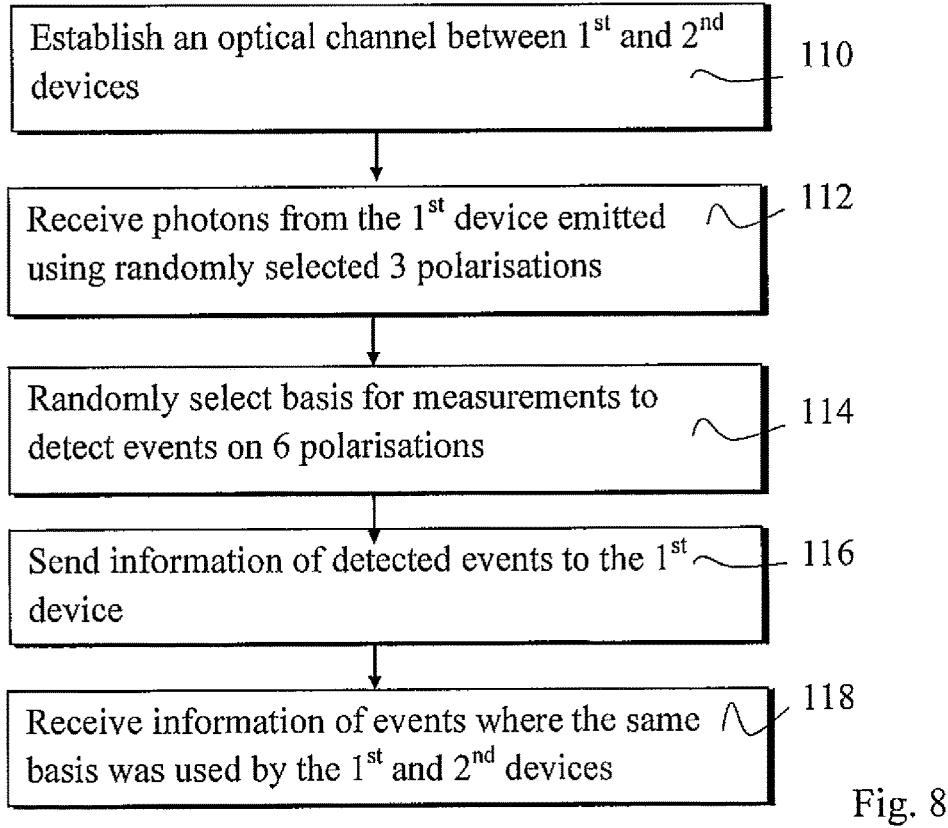

FIG. 8 shows actions taken by the recipient device. After establishment of the optical channel at 110 the recipient device receives at 112 from the sender device photons via the optical channel based on a first polarization, a second polarization and a third polarization. Alignment of a polarization system in a plane perpendicular to the first and second polarizations is not necessary. Basis for measurement of received photons for detection of events on six polarization bases is randomly selected at 114. Information of detected events in association with three basis is then sent at 116 to the sender device. Thus in steps 112 and 116 information only about the three basis is sent and information of the polarizations is not exchanged as this could reveal the key. Information is then received at 118 from the sender device regarding events where the same basis was used by the sender device and the recipient device. Examples of use of this information will be given below with reference to FIG. 9.

Figure 9:
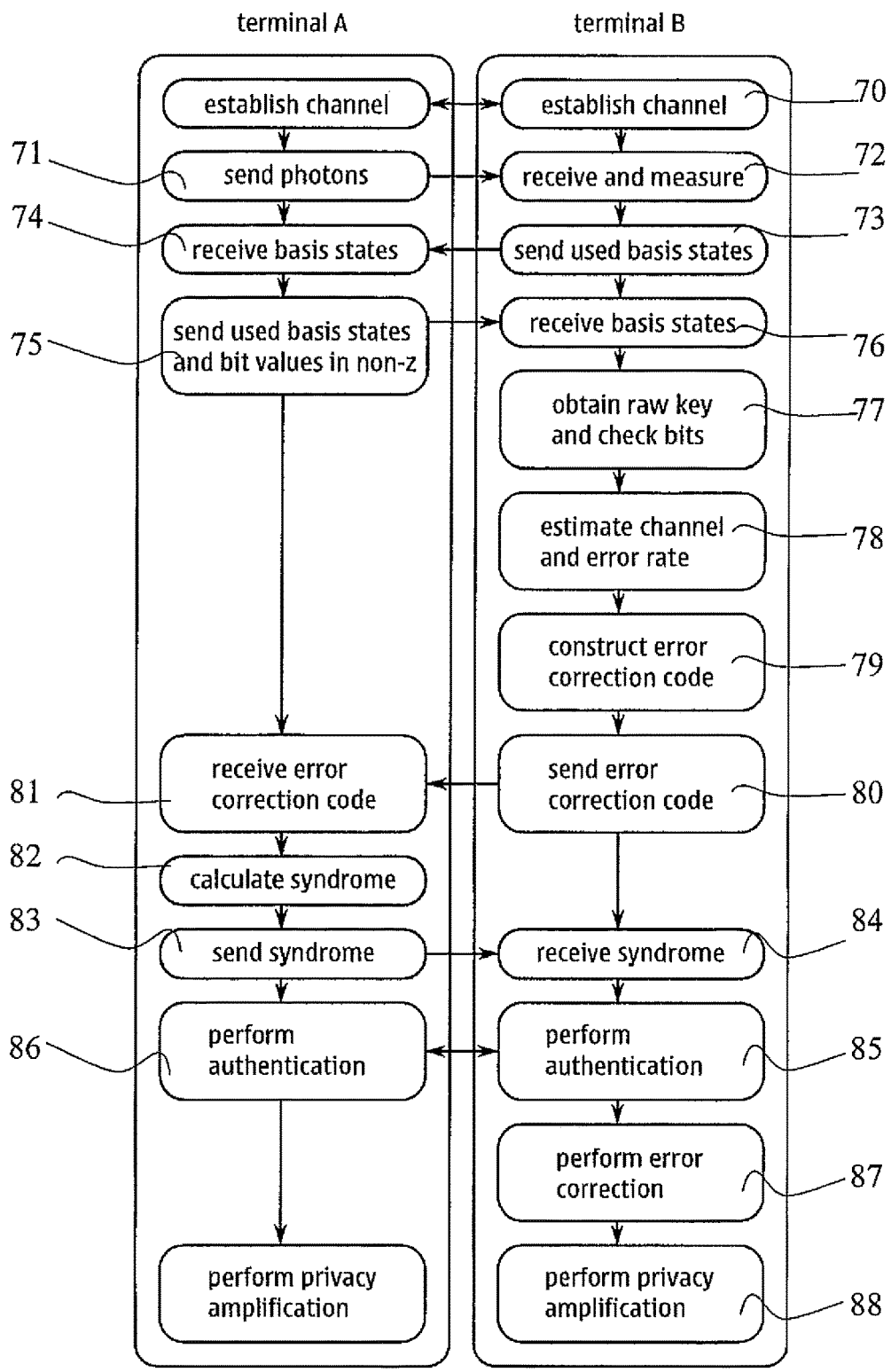

A more detailed procedure for distributing a key between the first and recipient devices in accordance with an embodiment is shown in FIG. 9 for the terminals shown in FIG. 2. An optical channel is established between terminal A and terminal B at 70. A steering mechanism consisting of e.g. movable mirrors and/or other optical elements (e.g. lenses, pinholes, spatial phase modulators) can be used to direct the light beam from terminal A to terminal B as well as adjusting the receiver in terminal B in a way to receive the beam from terminal A. Once the optical channel is established terminal A can start sending photons to terminal B at 71. There is no need to align polarizations coordinate systems are in the XY plane. The sender basis can be chosen at this stage in a truly random way. In accordance with a possibility a quantum random number generator can act as a source for the randomness. The random number generator can be operated in real-time or fill up a random number buffer for later use.

Distribution between the three possible sender states can be used influence the final key distribution rate. The distribution can be chosen such that the key rate can be optimized.

Light sources s in terminal A may be activated periodically with a fixed period. This allows suppression of dark counts on the receiver side.

After appropriate attenuation only a small fraction of time slots may contain a photon. Terminal B receives and detects at 72 the photons and records their arrival time. The design of the optical decoder can be such that the measurement basis is chosen randomly.

In order to allow the suppression of random counts the clocks of terminal A and terminal B are synchronized. This can be provided for example by sending a clocking signal between terminal A and terminal B as part of a transmission or by adjusting the clock in terminal B in order to maximize the count rate.

Figure 10:
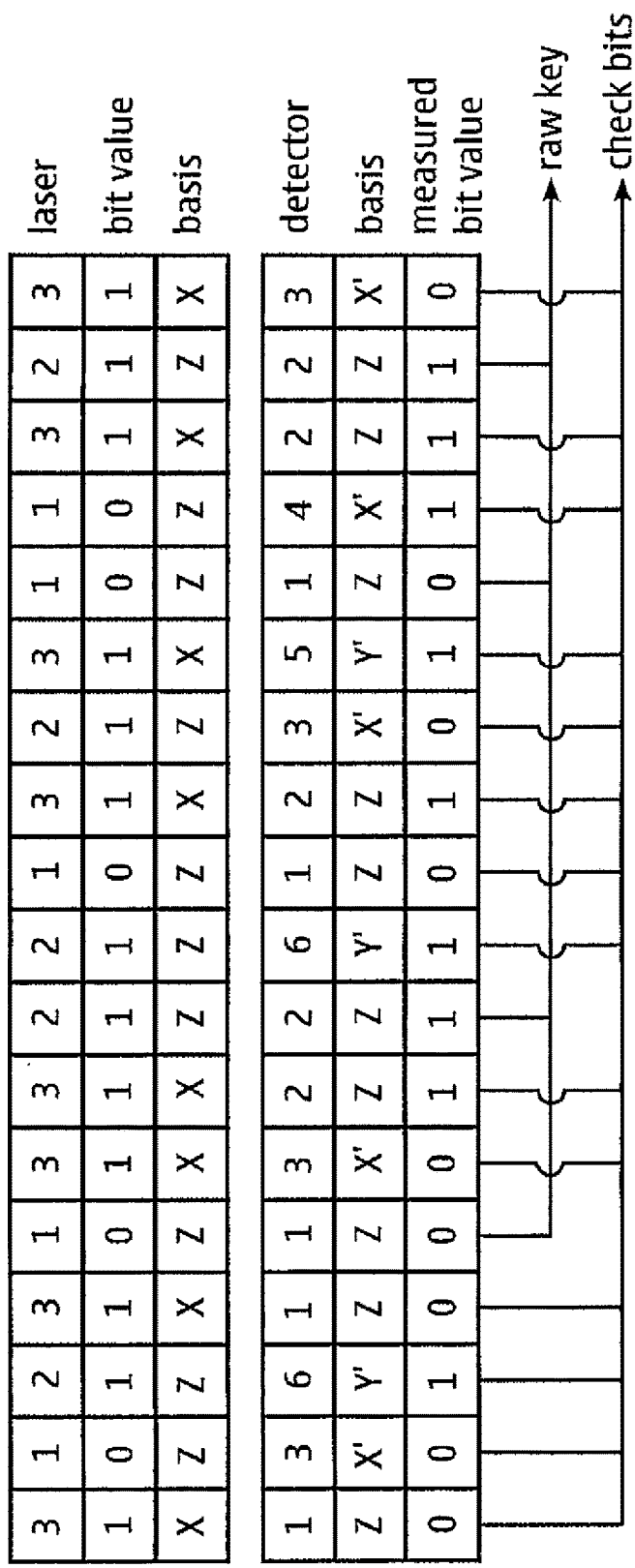
FIG. 10 is a diagram visualizing key sifting process.

Any random/non-valid detection events can be rejected. Terminal B maintains a record of valid detector events for all six detectors. The record of the measured bases and the timing information is sent at 73 to terminal A. Terminal A correlates the record received at 74 from terminal B with its own record and returns at 75 the sent basis states and the bit values if the basis is not z for both terminal A and terminal B. Terminal B receives this information at 76 and obtains a raw key and check bits at 77. A small number of bit values for the case when both bases are z can be sent for the purpose of estimating the error rate at 78 for an error correction procedure. Thus not all bits where both bases are z may be used for the raw key. A small number can be used for parameter estimation and error correction step. Terminal A then performs a sifting of the received information and uses it to (see FIG. 10) obtain a raw key from events where the basis was z for both terminal A and terminal B. The sifting can consist of retaining only bits where the basis was z for both terminals. The raw key in FIG. 10 example would then be 0101. The remaining events (check bits) are used to detect the presence of an eavesdropper. The presence of an eavesdropper may be detected for example based on a parameter estimation process.

Based on the error estimate in the z-z basis an error correcting code is constructed at 79 by terminal B and is sent at 80 to terminal A over a wireless link between the terminals. An example of a possible error correction code is a Low-density parity-check (LDPC) code. Terminal A receives the code at 81 and computes at 82 an error syndrome from the error correcting code and returns the error syndrome at 83 to terminal B. Terminal B receives the error syndrome at 84 and then performs error correction at 87 using e.g. a sum-product algorithm. Authentication may be performed at 85 and 86.

After successful error correction terminal A and terminal B have identical raw keys.

Errors may be introduced during transmission either by random events or an eavesdropper. The raw key held by the recipient terminal may have errors which need to be corrected, while the key in the sender terminal is correct since it comes from a guaranteed random source. Error correction can take place in terminal B.

During the procedure an eavesdropper may have had the possibility to collect information about the key in two stages: during the transmission of optical pulses from terminal A to terminal B and during the unsecure exchange of information during error correction. Loss of information to an eavesdropper during optical transmission can be estimated from the check bits. An example for this is discussed below.

In order to estimate error rates we consider the vector $r_b = (x+, z+, z-)$ corresponding to each transmitted direction $b = (x+, z+, z-)$, where $$x_b = p_{x+|b} - p_{x-|b};$$

and similarly for the polarizations y and z with the probability to register a click in detector $a = (x+, x-, y+, y-, z+, z-)$ given by $$p_{a|b} = D_a / S_b.$$

In the above $D_a$ is the number of detector events in detector a and $S_b$ is the number of sent photons in direction b.

Similar considerations apply for polarizations y and z. For an errorless transmission we obtain $r_{x+} = (\cos \alpha, \sin \alpha, 0)$, $r_{z+} = (0, 0, 1)$ and $r_{z-} = (0, 0, -1)$, where $\alpha$ is the misalignment of the polarizations between terminal A and terminal B. Note that for an errorless transmission the length of the vector is unity, and thus independent of the misalignment. Any eavesdropping attempt will result in deviations from this ideal behavior. The leaked information can be estimated from this using an appropriate method.

The potential loss of information to an eavesdropper during error correction is the number of bits exchanged during error correction which are correlated with the raw key. In order to obtain a secure key the partially secure raw key can be shortened using a two-universal hash-function at privacy amplification step 88. The amount of shortening depends on the amount of information leaked during error correction and the estimated leak during the optical communication.

In the above examples single photons per pulse were emitted in each polarization. This is not necessary in all scenarios and multiple photons may be also used in certain applications.

The embodiments may be beneficial e.g. because a simple polarization based quantum key distribution system may be provided that tolerates misalignment of polarization direction between a sender and a receiver device and a precise alignment of the polarizations (HP) is not necessary. The scheme may make efficient use of distributed photons as no send/measure pairs are discarded.

It is noted that whilst embodiments have been described using a mobile system as an example, similar principles can be applied to any other communication system where security needs to be provided between communicating devices. For example, instead of communications between a mobile station and a base station the communications may be provided between two mobile devices, or between two static or semi-static devices. For example, the principles can be applied where no fixed equipment is provided but a communication system is provided by means of a plurality of user equipment, for example in ad-hoc networks. Therefore, although certain embodiments were described above by way of example with reference to certain exemplifying architectures for wireless networks, technologies and standards, embodiments may be applied to any other suitable forms of communication systems than those illustrated and described herein.

Figure 11:
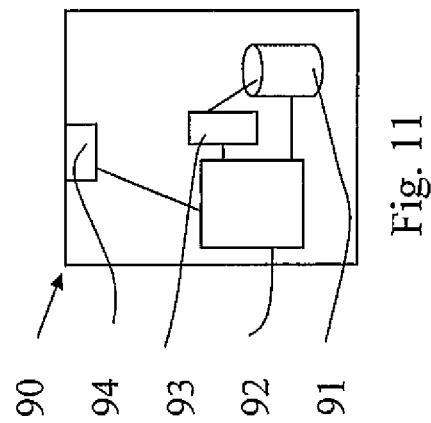
FIG. 11 shows an example of control apparatus.

Mobile devices, base stations and other communicating devices are typically controlled by at least one appropriate controller apparatus so as to enable operation thereof and control of wireless communications between the devices and/or the base station. The control apparatus can be interconnected with other control entities. FIG. 11 shows an example of a control apparatus 90 capable of operating in accordance with the embodiments, for example to be coupled to and/or for controlling devices 10 and 20. The control apparatus can be configured to provide control functions in association with determination of various information, generation and communication of information between the various entities and/or control functions based on such information by means of the data processing facility in accordance with the certain embodiments described above. For this purpose the control apparatus comprises at least one memory 91, at least one data processing unit 92, 93 and an input/output interface 94. The control apparatus can be coupled to a receiver and/or transmitter of the relevant node via the interface. The control apparatus can be configured to execute an appropriate software code to provide the control functions. The control apparatus and functions may be distributed between a plurality of control units.

The required data processing apparatus and functions may be provided by means of one or more data processors. The described functions may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the spirit and scope of this invention as defined in the appended claims. Indeed there is a further embodiment comprising a combination of one or more of any of the other embodiments previously discussed.

What is claimed is:

1. An apparatus comprising:
   at least one processor; and
   at least one memory including computer program code, where the at least one memory and the computer program code are configured, with the at least one processor, to cause the apparatus to at least:
   output dual rail-encoded states of light in a time slot, wherein the states of light dual rail-encode information according to at least one of a phase and intensity difference between the dual rail-encoded states of light, and wherein the dual rail-encoded states of light are using integrated waveguides that convert three optical inputs to two optical outputs;
   convert the rail-encoded states of light to at least one polarization-encoded state of light, wherein the at least one polarization-encoded state of light is randomly selected from among three possible polarization rotations;
   optically filter the at least one polarization-encoded state of light to match at least one of spatial and frequency characteristics across all of the at least one polarization-encoded state of light that are optically transmitted from the apparatus;
   attenuate each of the optically filtered at least one polarization-encoded state of light to a same number of photons for transmission; and
   use at least the at least one polarization-encoded state of light and the attenuated states of light, form a quantum cryptographic key that is transmitted to a recipient device over an optical link.

2. The apparatus according to claim 1, wherein the intensity difference is generated by the apparatus to be equal between the dual rail-encoded states of light.

3. The apparatus according to claim 1, wherein:
   the apparatus is caused to rail encode outputs of the integrated waveguide using a polarization rotator-combiner.

4. The apparatus according to claim 1, wherein the apparatus is caused to randomly define the at least one polarization-encoded state.

5. The apparatus according to claim 1, wherein the at least one polarization-encoded state of light comprises more than three polarization-encoded states of light.

6. The apparatus according to claim 5, wherein the three polarization-encoded states of light comprise two opposite polarizations.

7. The apparatus according to claim 6, wherein a third polarization-encoded state of light of the three polarization-encoded states of light is in a plane perpendicular to two opposite polarization-encoded states of light.

8. The apparatus according to claim 1, wherein the sender device is caused to at least one of detect photon splitting attacks and to implement decoy states by varying a value of the same number of photons when distributing different quantum cryptographic keys.

9. A non-transitory computer readable memory tangibly storing a computer program that when executed by a host device causes the host device to:
   rail encode optical inputs so as to output dual rail-encoded states of light in a time slot, wherein the states of light dual rail-encode information according to at least one of a phase and intensity difference between the dual rail-encoded states of light, and wherein the dual rail-encoded states of light are using integrated waveguides that convert three optical inputs to two optical outputs;
   convert the rail-encoded states of light to at least one polarization-encoded state of light, wherein the at least one polarization-encoded state of light is randomly selected from among three possible polarization rotations; and
   use at least the at least one polarization-encoded state of light, to form a quantum cryptographic key that is transmitted to a recipient device.

10. The computer readable memory according to claim 9, wherein the intensity difference is generated to be equal between the dual rail-encoded states of light.

11. The computer readable memory according to claim 9, wherein the at least one polarization-encoded state of light is randomly defined.

12. An apparatus comprising:
   at least one processor; and
   at least one memory including computer program code, where the at least one memory and the computer program code are configured, with the at least one processor, to cause the apparatus to at least:
   decode dual rail-encoded states of light in a time slot, wherein the states of light dual rail-encode information according to at least one of a phase and intensity difference between the dual rail-encoded states of light, and wherein the dual rail-encoded the states of light are using integrated waveguides that convert three optical inputs to two optical outputs;
   convert the rail-encoded states of light to at least one polarization-encoded state, wherein the at least one polarization-encoded state is randomly selected from among three possible polarization rotations;

optically filter the at least one polarization-encoded states of light to match at least one of spatial and frequency characteristics across all of the at least one polarization-encoded states of light that are optically transmitted from the apparatus;

attenuate each of the optically filtered at least one polarization-encoded states of light to a same number of photons for transmission; and use at least the at least one polarization-encoded state, form a quantum cryptographic key to transmit to a recipient device.

13. The apparatus according to claim 12, wherein the intensity difference is equal between the dual rail-encoded states of light.

14. The apparatus according to claim 12, wherein the apparatus is caused to decode dual rail-encoded states of light after first decoding the at least one polarization-encoded states of light.

15. The apparatus according to claim 12, wherein the apparatus is caused to decode the dual rail-encoded states of light on 2N parallel channels, and to detect on each channel one of N possible polarization states.

16. The apparatus according to claim 12, wherein the apparatus comprises inputs to an optical decoder that comprise a quantum cryptographic key received at the recipient device from a sender device over an optical link.

17. A non-transitory computer readable memory tangibly storing a computer program that when executed by a host device causes the host device to:

rail decode dual rail-encoded states of light in a time slot, wherein the states of light dual rail-encode information according to at least one of a phase and intensity difference between the dual rail-encoded states of light, and wherein the dual rail-encoded the states of light are using integrated waveguides that convert three optical inputs to two optical outputs;

decode at least one polarization-encoded states of light, wherein decoding the at least one polarization-encoded states of light decodes a randomly selected polarization rotation from among three possible polarization rotations; and based on at least the decoded randomly selected polarization rotation, determine a quantum cryptographic key from a sender device.

18. The non-transitory computer readable memory according to claim 17, wherein the intensity difference is equal between the dual rail-encoded states of light.

* * * * *